(12) United States Patent
Eom

(10) Patent No.: US 6,625,279 B1
(45) Date of Patent: Sep. 23, 2003

(54) APPARATUS AND METHOD OF ESTIMATING ECHO PATH DELAY

(75) Inventor: Kwang-Seop Eom, Songnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 622 days.

(21) Appl. No.: 09/619,226

(22) Filed: Jul. 19, 2000

(30) Foreign Application Priority Data

Jul. 19, 1999 (KR) .............................................. 99-29138

(51) Int. Cl.[7] .............................. H04M 1/00; H04B 3/20
(52) U.S. Cl. .............................. 379/406.01; 379/406.08; 379/406.02; 370/286; 370/290
(58) Field of Search ............................ 379/392.01, 391, 379/390.02, 406.01, 406.08, 406.06, 406.02, 406.07, 406.12; 370/286, 290, 289; 455/278.1, 114.2, 296

(56) References Cited

U.S. PATENT DOCUMENTS 5,058,047 A * 10/1991 Chung ................... 379/406.01
5,721,782 A * 2/1998 Piket et al. .................... 381/66
5,917,809 A * 6/1999 Ribner et al. ............... 370/286
6,480,532 B1 * 11/2002 Vareljian ..................... 375/222

* cited by examiner

Primary Examiner—Rexford Barnie
(74) Attorney, Agent, or Firm—Cha & Reiter

(57) ABSTRACT

Disclosed is an echo path delay estimating apparatus and method for estimating the echo path delay using decimators and an adaptive filter, so that a short computation time is used by the echo canceller. The apparatus comprising: a first low pass filter for receiving a the sound signal as a first sound signal and for filtering the first sound signal at a predetermined bandwidth; a first decimator for decimating the output signal of the first low pass filter at a predetermined decimation rate; a second low pass filter for receiving the echo caused by the first sound signal as a second sound signal and for filtering the second sound signal at a predetermined bandwidth; a second decimator for decimating the output signal of the second low pass filter at a predetermined decimation rate; an adaptive filter for receiving the output signal of the first and second decimators to compute an echo delay estimation value; and, a canceller for subtracting the echo delay estimation value from the output signal of the second decimator.

20 Claims, 3 Drawing Sheets

APPARATUS AND METHOD OF ESTIMATING ECHO PATH DELAY

CLAIM OF PRIORITY

This application makes reference to, incorporates the same herein, and claims all benefits accruing under 35 U.S.C. Section 119 from an application for APPARATUS AND METHOD FOR ESTIMATING AN ECHO PATH DELAY filed earlier in the Korean Industrial Property Office on Jul. 19, 1999 and there duly assigned Serial No. 29138/1999.

BACKGROUND OF THE INVENTION

1. Field of the Invention

The present invention relates to an apparatus and method for estimating an echo path delay. More particularly, the present invention relates to an apparatus and method for estimating an echo path delay using an adaptive filter and decimators.

2. Description of the Related Art

Generally, an echo inherently exists in a long-distance telephone service between switching offices in different local exchange areas and two wire-circuits within each area connecting telephone subscribers within the switch office. As the speech energy between the two and four-wire circuits, being effected by hybrid circuits, do not perfectly match the impedance between different two-wire and four-wire circuits, the echo is an inevitable characteristic in a public switched telephone network. In order to remove the echo, an echo canceller is used to cancel the echo which would otherwise return to the far end speaker. The echo canceller estimates and cancels the echo returned from the hybrid circuits using an adaptive filter, which uses a technique known as Normalized Least Mean Squares (NLMS) adaptation. However, as the echo delay time increases, the NLMS adaptive filter experiences longer processing time due to the longer processing required computation time.

Each delay associated with the telephone service can be defined as two types: a transmission delay (TDL) and an impulse response delay (TDP). The TDL represents a normal delay time associated with the transmission of a signal. The TDP represents the impulse response duration caused by the hybrid circuits. If the units of TDL and TDP are in seconds, an echo delay time (DL) corresponds to the natural delay time (TDL) multiplied by a sampling rate, and an echo duration time (DP) corresponds to the impulse response delay (TDP) multiplied by a sampling rate. For example, if the sampling rate is 8 kHz and the measured TDL is 64 msec, the DL=8000 Hz×64 msec=512. Thus, the sum of a whole delay (D) can be represented by the following equation: D=DL+DP, and the amount of computation required by the echo canceller, per each sample, is approximately 4*D.

As explained above, the prior art echo canceller has drawbacks in that it requires much longer computation time because the whole delay time (D=DL+DP) has to be processed. For example, in the case of calculating by a million instructions per second (MIPS) at a sampling frequency of 8 KHz, the conventional echo canceller without the echo estimating device requires a computation duration of 4*D*8000 MIPS. Each sample requires four times the whole delay time for processing. Thus, the prior art canceller requires 16.384 MIPS (=4*D*8000 MIPS) of processing time if the whole each delay time is 64 msec (i.e., D =64 msec×8000 Hz=512).

Since the TDP is normally less than 8 msec (or the DP is less than 64 msec), the required computation time does not exceed 4*64*8000=2.048 MIPS. Thus, if the echo delay time (DL) can be estimated, the echo delay time becomes smaller and the computation time required for canceling the echo becomes shorter and less burdensome to the system.

SUMMARY OF THE INVENTION

Accordingly, the present invention has been made in an effort to solve the problems occurring in the related art, and the object of the present invention is to provide an apparatus and method for estimating an echo path delay time.

It is another object of the present invention to provide an apparatus and method of canceling an echo by estimating only the echo factor caused by the hybrid circuits.

In order to achieve the above objects, according to the present invention, there is provided an apparatus for cancelling an echo included in a sound signal transmitted from one end speaker to a far end speaker comprising: a first low pass filter for receiving a the sound signal as a first sound signal and for filtering the first sound signal at a predetermined bandwidth; a first decimator for decimating the output signal of the first low pass filter at a predetermined decimation rate; a second low pass filter for receiving the echo caused by the first sound signal as a second sound signal and for filtering the second sound signal at a predetermined bandwidth; a second decimator for decimating the output signal of the second low pass filter at a predetermined decimation rate; an adaptive filter for receiving the output signal of the first decimator and the output signal of the second decimator to compute an echo delay estimation value; and, a canceller for subtracting the echo delay estimation value from the output signal of the second decimator.

In another aspect of the present invention, there is provided a method of estimating an echo delay in an echo delay estimating apparatus having an adaptive filter, comprising the steps of: preparing and initializing three buffers of the adaptive filter; performing a modelling with respect to an echo transfer function; searching the position of a coefficient having the largest absolute value among the coefficients of the adaptive filter; obtaining the position of the coefficient having the biggest absolute value; obtaining an actual value of the coefficient having the largest absolute value; obtaining an echo return loss enhancement (ERLE) value using an input and the output of the adaptive filter; and, obtaining an echo delay estimation value.

BRIEF DESCRIPTION OF THE DRAWINGS

The above objects and advantages of the present invention will become more apparent by describing in detail the preferred embodiments thereof with reference to the attached drawings in which.

DETAILED DESCRIPTION OF THE PREFERRED EMBODIMENTS

In the following description, for the purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
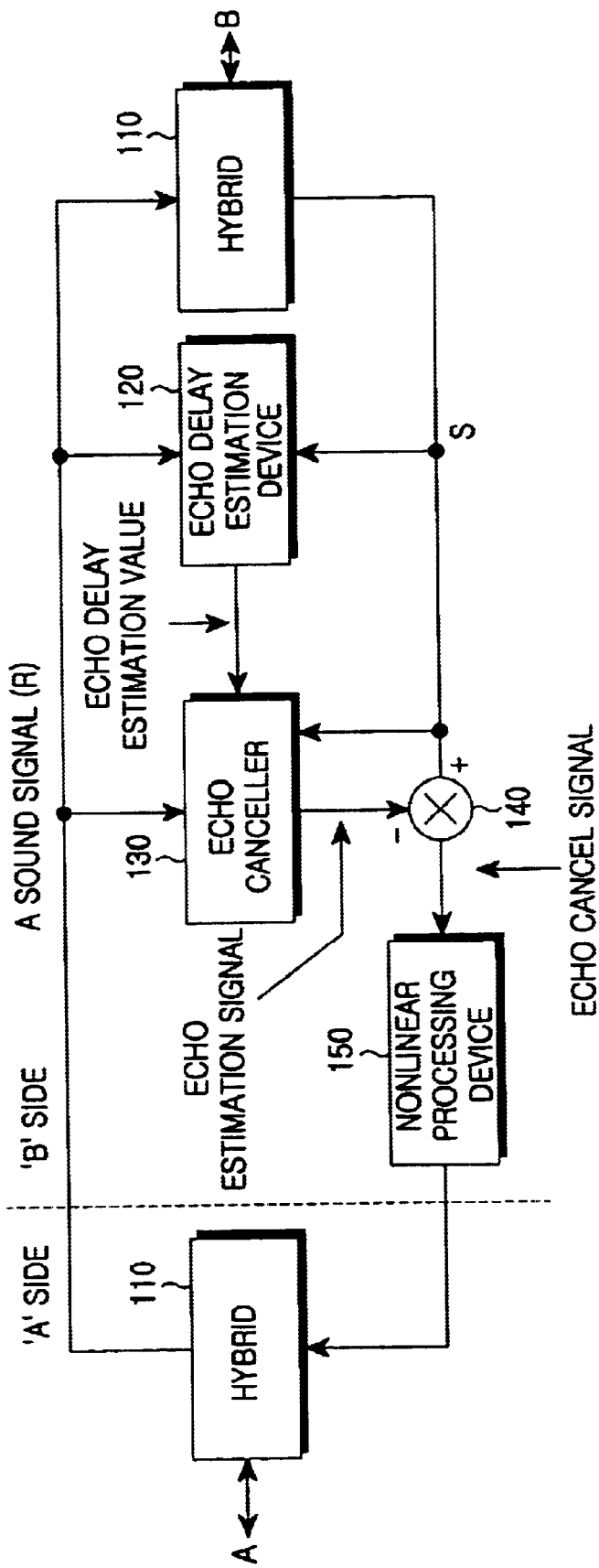
FIG. 1 is a block diagram illustrating the construction of an echo canceller according to the present invention.

FIG. 1 is a block diagram illustrating the construction of an echo canceller according to the present invention.

With reference to FIG. 1, the first sound signal R inputted from an "A" side is transferred to a "B" side through a hybrid 110. The sound signal inputted from the "B" side and the echo signal responsive to a portion of the first sound signal R that is echoed back as a result of the previously noted imperfections in the local system constitute a second sound signal S, which is transferred to an echo delay estimating device 120. The echo delay estimating device 120 receives the first and second sound signals, R and S, respectively, and calculates an echo delay estimation value DL. The echo delay estimation value DL is transferred to an echo canceller 130. Then, the echo canceller 130 computes an echo estimation value (EHAT) using the echo delay estimation value DL received from the echo delay estimating device 120 as well as the signals R and S.

Briefly, the generation of each estimation value (EHAT) comprises of obtaining individual samples of the signal on the receiving channel, convolving the samples with the impulse response of the system and then subtracting, at the appropriate time, the resulting echo estimate value from the actual echo on the transmit channel. Thus, in determining the echo estimation value (EHAT) according to the present invention, a modeling with respect to an impulse response or a transfer function of the hybrid circuit 110 is performed, then a convolution with the input signal R is performed. That is, the value of EHAT represented by, EHAT=H*R, wherein H represents the impulse response of the hybrid circuit that is modeled, and corresponds to the adaptive filter coefficient of the echo canceller 130. The number of coefficients should be sufficient to cover the duration of the whole delay time (D). The tap coefficients for such an adaptive response filter are found using a technique known as Normalized Least Squares adaptation. The coefficient value of the first portion of the echo delay estimation value (DL), which corresponds to the pure echo delay time portion of the whole echo delay time D, is always made to "0", so that the coefficient value of DP representing the remaining echo duration time is used to compute the echo estimation value (EHAT). The following function may be applied:

$$H=[h(0),h(1),\ldots,h(DL-1),h(DL),\ldots,h(D-1)]=[0,0,\ldots,0,h(DL),\ldots,h(D-1)],$$

Wherein h(n) represents an estimated impulse response value according to the time index.

Accordingly, the echo canceller 130 receives the first and second sound signal, R and S, and the echo delay estimation value DL to determine the echo estimation value EHAT, then transfers the echo estimation value (EHAT) to a canceller 140. The canceller 140 determines a value, which is obtained by subtracting the echo estimation value (EHAT) from the second sound signal S, for a nonlinear processing device 150. Then, the nonlinear processing device 150 determines whether the value outputted from the canceller 140 includes a residual echo. Although the hybrid circuit is a nonlinear device, the echo canceller assumes the impulse response of the hybrid circuit as linear, thus producing residual echo. Another reason of having the residual echo arises as a result of quantization error associated with the analogue to digital conversion and vice versa. Thus, if the residual is detected, the nonlinear processing device 150 converts the residual echo signal in forms of zeros or to a comfort noise; otherwise, the nonlinear processing device 150 bypass the signal received therein.

Figure 2:
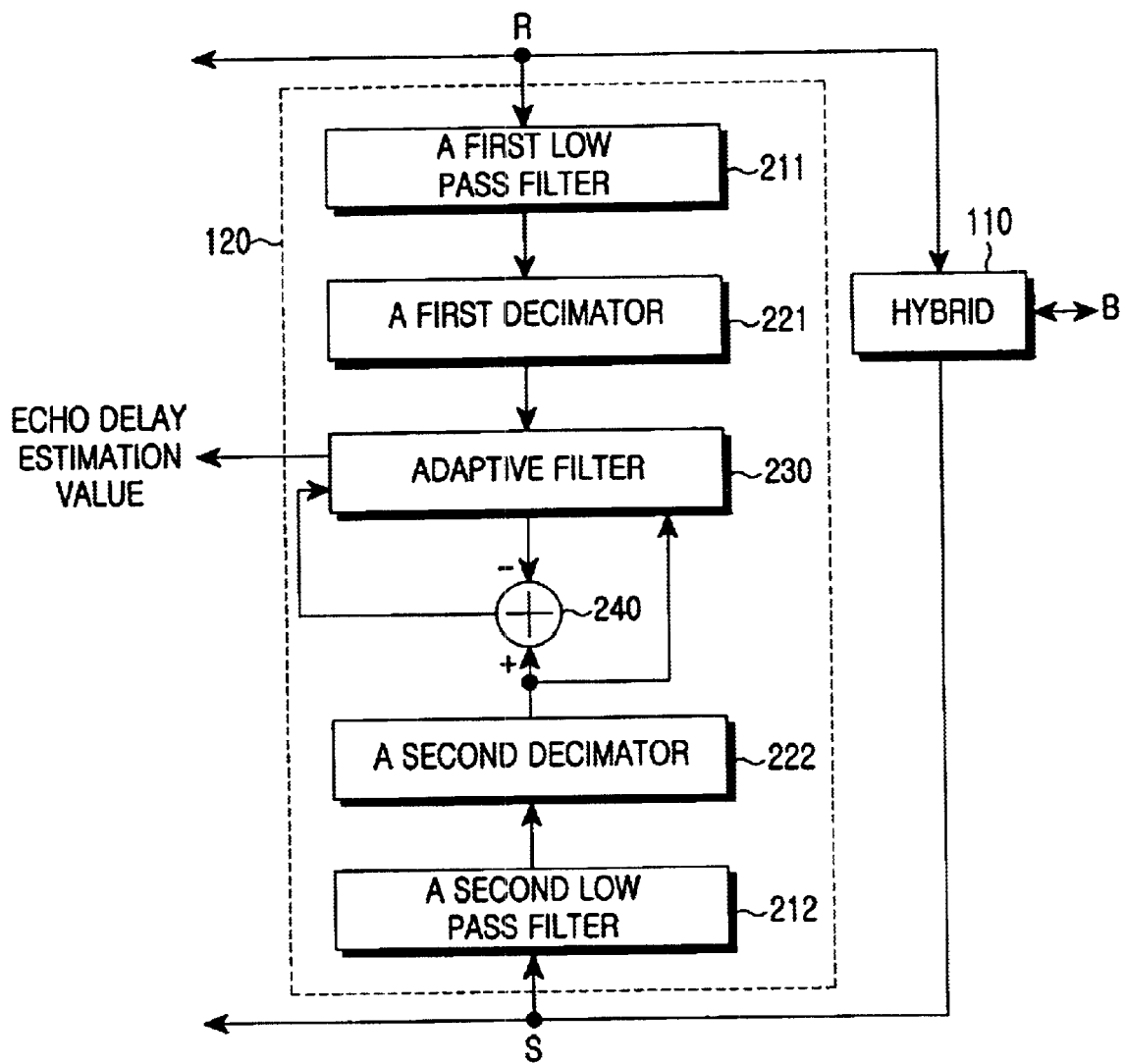
FIG. 2 is a block diagram illustrating the construction of an echo path delay estimating apparatus according to the present invention; and, FIG. 3 is a flowchart illustrating the echo path delay estimating process according to the present invention.

FIG. 2 is a block diagram illustrating the construction of an echo path delay estimating device 120 according to the present invention. Referring to FIG. 2, the echo path delay estimating apparatus includes a first low pass filter 211, a second low pass filter 212, a first decimator 221, a second decimator 222, an adaptive filter 230, and a canceller 240.

Now, the operation of the echo path delay estimating device according to the present invention will be explained with reference to FIGS. 1 and 2.

The first low pass filter 211 filters the first sound signal R inputted thereto at a predetermined bandwidth. The first low pass filter 211 serves to filter a low frequency component of the first sound signal R and to avoid aliasing problem. Thus, the first low pass filter 211 lowers the bandwidth of the first sound signal to the bandwidth of 4 KHz. The first decimator 221 receives the low cutoff frequency and decimates the output signal of the first low pass filter 211.

Similarly, the second low pass filter 212 filters the second sound signal S inputted thereto at a predetermined bandwidth and filters a low frequency component of the second sound signal S. The second low pass filter 222 acts as anti-aliasing measures and lowers the bandwidth of the second sound signal to the bandwidth of 4 KHz. The second decimator 222 receives the filtered second sound signal and decimates the output signal from the second low pass filter 212.

At this time, different low pass filters should be constructed according to the decimation grade. For example, in case of using the ¼ decimation technique, a low pass filter having a bandwidth of 1 KHz may be used according to the following Equation 1.

$$y(n)=0.9428y(n-1)-0.3333y(n-2)+0.0976(x(n)+2x(n-1)+x(n-2)), \quad \text{[Equation 1]}$$

wherein x(n) represents the input of the low pass filter, y(n) represents the output of the low pass filter, and n represents a time index.

As described above, the grade of decimation may be changed according to its purpose. The echo delay estimating apparatus according to the present invention can achieve optimal performance by using the grade of about ¼ decimation.

The adaptive filter 230, or a digital finite impulse response filter, having a plurality of taps each having a corresponding tap coefficient receives the output signal of the first decimator 221 and the output signal of the second decimator 222, then computes an echo delay estimation value. According to the present invention, the adaptive filter 230 employs a Normalized Least Mean Square (NLMS) algorithm in determining the echo delay estimation value. For example, in the case of using ¼ decimation and at a sampling rate of 8 KHz, the amount of computation becomes (512/4)*(8000/4)=0.256 MIPS with respect to the total echo delay time of 64 msec. In the prior art, the required computation is 16.384 MIPS as previously noted. Thus, there is a decrease in the computation processing time in the present invention.

Figure 3:
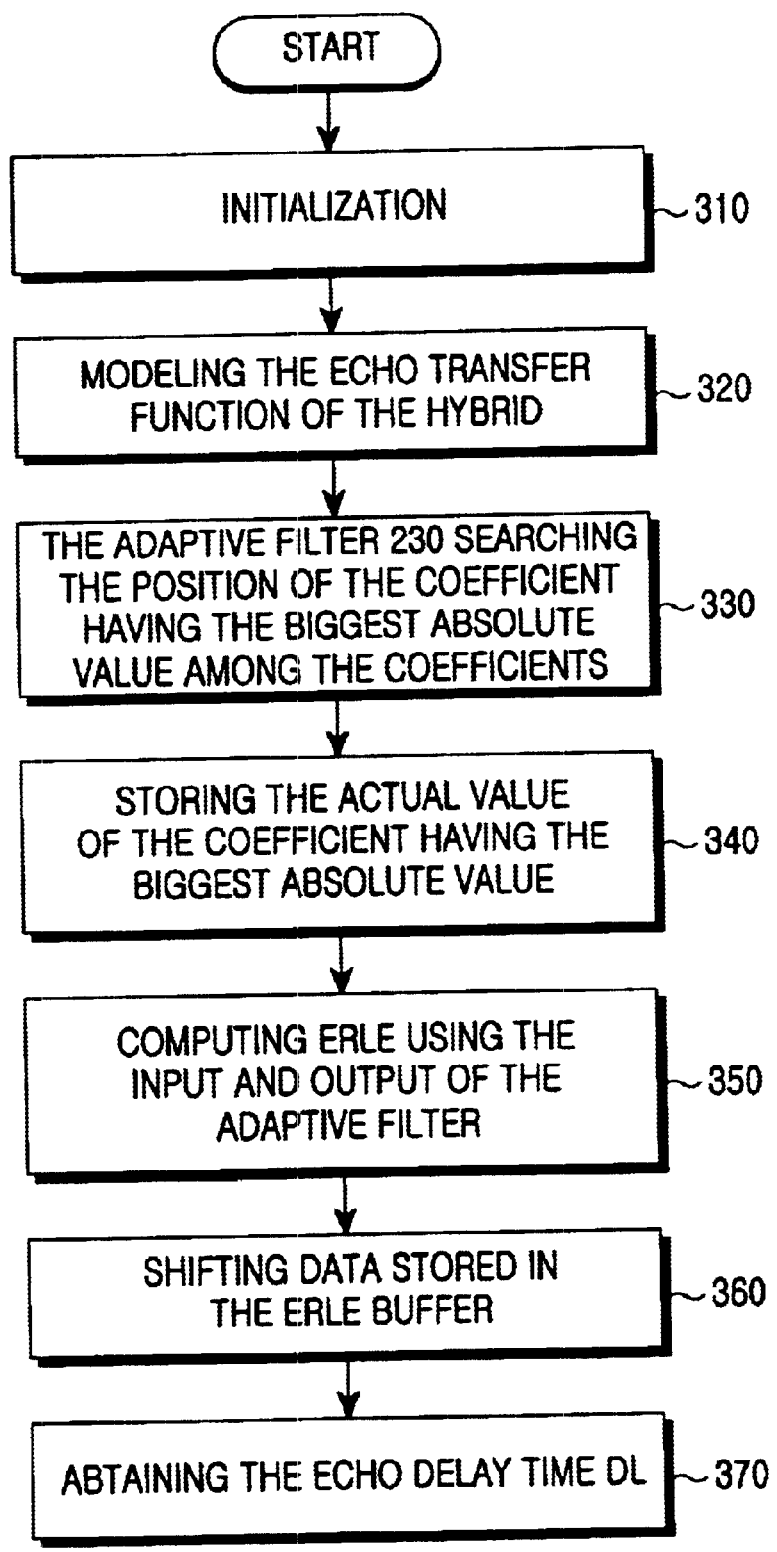

FIG. 3 is a flowchart illustrating an echo path delay estimating process according to the present invention. With reference to FIGS. 2 and 3, the echo delay estimating method according to the present invention will be explained.

At step 310, the adaptive filter 230 prepares three buffers having the size of 3, and makes their initial values into all "0". Here, the three buffers are represented as follows:

Position [3], height [3], erle [3]

At step 320, the adaptive filter 230 models the echo transfer function of the hybrid 110. Here, the echo transfer function is continuously stored as coefficient values of the adaptive filter 230 to match the echo response of the overall system.

At step 330, the adaptive filter 230 searches the position of the coefficient having the biggest absolute value. For example, for the whole echo delay time of 64 msec using ¼ decimation, the adaptive filter 230 searches the coefficient having the largest absolute value of the 128 coefficients.

At step 340, the adaptive filter 230 performs the following operation in order to store the actual value of the coefficient having the biggest absolute value.

Position [2]=position [1]; position [1]=position [0]; position [0]=position of the coefficient having the biggest absolute value.

Height [2]=height [1]; height [1]=height [0]; height [0]= actual value of the coefficient having the biggest absolute value.

At step 350, the adaptive filter 230 computes the echo return loss enhancement (ERLE) value according to the following Equation 2 using the output of the second sound signal S. The ERLE represents a degree of echo cancellation.

ERLE =10*log10 (mean power of the input signal R of the adaptive filter)—10*log10 (mean power of the output signal S of the adaptive filter)        [Equation 2]

At step 360, the adaptive filter 230 shifts data stored in the ERLE buffer according to the obtained ERLE value as follows.

erle [2]=erle [1]; erle [1]=erle [0]; erle [0]=ERLE value

At step 370, the adaptive filter 230 obtains the echo delay time DL. The operation performed for obtaining the echo delay time DL is represented as follows:

If((position [0]==position [1] && position [1]==position [2])

&& ((height [0]>0 && height [0]>=height [1] && height [1]>=height [2])

|(height [0]<0 && height [0]<=height [1] && height [1]<=height [2]))

&& (erle [0]>=erle [1] && erle [1]>=erle [2]))

then, DL =(presently searched position)*4 else, DL =previous DL.

That is, the adaptive filter 230 determines whether the position of the coefficient with the largest absolute value is equal to the previous position of the coefficient with the largest absolute value. Then, the adaptive filter 230 determines whether the value of the coefficient having the largest absolute value is gradually increased (i.e., becomes greater in a '−' direction), or gradually decreased (i.e., becomes greater in a '−' direction). Then, the adaptive filter 230 determines whether the value stored in the ERLE buffer is gradually decreased which represents the most recent value. By multiplying four times the position that satisfies the above conditions, the echo delay estimation value is obtained. Here, the reason why the position satisfying the above conditions is multiplied four times is because the ¼ decimation was performed.

As described above, the echo delay estimating apparatus 120 determines the echo delay estimation value by repeatedly performing the above-mentioned process using the adaptive filter 230, and provides the determined echo delay estimation value to the echo canceller 130.

The echo canceller 130 determines the echo estimation value using the echo delay time (DL) received from the echo delay estimating apparatus 120, and in return the echo canceller 130 determines the echo estimation signal (EHAT) based on the echo delay time value, input signal of the receiving channel, and the signal-and-noise combined signal to compensate the echo from the system.

As described above, according to the present invention, the echo estimation value is obtained through a constant computation time that is irrespective of the echo path delay. That is, the present invention can obtain the echo delay estimation value which is used for canceling the echo using a short computation time that is not burdensome to the system.

While this invention has been described in connection with what is presently considered to be the most practical and preferred embodiment, it is to be understood that other modifications thereof may be made without departing from the scope of the invention. Thus, the invention should not be limited to the disclosed embodiment but should be defined by the scope of the appended claims and their equivalents.

What is claimed is:

1. An apparatus for canceling an echo, comprising:

a first low pass filter for receiving a first sound signal and for filtering the first sound signal at a predetermined bandwidth;

a first decimator for decimating the output signal of the first low pass filter at a predetermined decimation rate;

a second low pass filter for receiving a second sound signal having the echo caused by the first sound signal and for filtering the second sound signal at a predetermined bandwidth;

a second decimator for decimating the output signal of the second low pass filter at a predetermined decimation rate; and, an adaptive filter for receiving the output signal of the first decimator and the output signal of the second decimator to compute an echo delay estimation value.

2. The apparatus as claimed in claim 1, further comprising a canceller circuit to generate an echo compensated signal based on the echo delay estimation value, the first and the second sound signals.

3. The apparatus as claimed in claim 1, further comprising a non-linear processing device for canceling a residual echo received from the canceller circuit.

4. The apparatus as claimed in claim 1, wherein the first decimator performs a ¼ decimation with respect to the output signal of the first low pass filter.

5. The apparatus as claimed in claim 1, wherein the second decimator performs a ¼ decimation with respect to the output signal of the second low pass filter.

6. The apparatus as claimed in claim 4, wherein the first low pass filter is a low pass filter having a bandwidth of 1 KHz given by the following equation:

$$y(n)=0.9428y(n-1)-0.3333y(n-2)+0.0976(x(n)+2x(n-1)+x(n-2)),$$

wherein x(n) represents the input of the low pass filter, y(n) represents the output of the low pass filter, and n represents a time index.

7. The apparatus as claimed in claim 5, wherein the second low pass filter is a low pass filter having a bandwidth of 1 KHz given by the following equation:

$$y(n)=0.9428y(n-1)-0.3333y(n-2)+0.0976(x(n)+2x(n-1)+x(n-2)),$$

wherein x(n) represents the input of the low pass filter, y(n) represents the output of the low pass filter, and n represents a time index.

8. The apparatus as claimed in claim 1, wherein the adaptive filter having adaptive tap coefficients to simulate an echo response during a call.

9. The apparatus as claimed in claim 1, wherein the echo delay estimation value is calculated during a call using a Least Mean Squares process.

10. An echo canceller circuit comprising:
a first low pass filter for receiving a first sound signal and for filtering the first sound signal at a predetermined bandwidth;
a first decimator for decimating the output signal of the first low pass filter at a predetermined decimation rate;
a second low pass filter for receiving a second sound signal having the echo caused by the first sound signal and for filtering the second sound signal at a predetermined bandwidth;
a second decimator for decimating the output signal of the second low pass filter at a predetermined decimation rate
an adaptive filter for receiving the output signal of the first decimator and the output signal of the second decimator to compute an echo delay estimation value; and,
a canceller circuit to generate an echo compensated signal based on the echo delay estimation value, the first and the second sound signals.

11. The apparatus as claimed in claim 10, further comprising a non-linear processing device for canceling a residual echo received therein.

12. The apparatus as claimed in claim 10, wherein the first decimator performs a ¼ decimation with respect to the output signal of the first low pass filter, and wherein the second decimator performs a ¼ decimation with respect to the output signal of the second low pass filter.

13. The apparatus as claimed in claim 12, wherein the first low pass filter and the second low pass filter have a bandwidth of 1 KHz and perform according to the following equation:

$$y(n)=0.9428y(n-1)-0.3333y(n-2)+0.0976(x(n)+2x(n-1)+x(n-2)),$$

wherein x(n) represents the input of the low pass filter, y(n) represents the output of the low pass filter, and n represents a time index.

14. The apparatus as claimed in claim 10, wherein the adaptive filter having adaptive tap coefficients to simulate an echo response during a call.

15. The apparatus as claimed in claim 10, wherein the echo delay estimation value is calculated during a call using a Least Mean Squares process.

16. A method for estimating an echo delay in an echo delay estimating apparatus with an adaptive filter having a plurality of tap coefficients, comprising the steps of:
preparing and initializing three buffers of the adaptive fileter;
simulating, using the tap coefficients of the adaptive filter, the echo delay during a call;
searching the position of one of the coefficients having a largest absolute value;
obtaining the position of the coefficient having the largest absolute value;
obtaining an actual value of the coefficient having the largest absolute value;
obtaining an echo return loss enhancement (ERLE) value using an input and an output of the adaptive filter; and,
obtaining an echo delay estimation value.

17. The method as claimed in claim 16, wherein the echo delay estimation value is determined according to the following steps:

If((position [0]==position [1] && position [1]==position [2])

&& ((height [0]>0 && height [0]>=height [1] && height [1]>=height [2])

|| (height [0]<0 && height [0]<=height [1] && height [1]<=height [2]))

&& (erle [0]>=erle [1] && erle [1]>=erle [2]))

then, the echo delay time (DL)=(presently searched position)*4 else, the echo delay time (DL)=previous echo delay time (DL).

18. The method as claimed in claim 16, wherein the three buffers are a position buffer, an actual value buffer, and an erle buffer.

19. The method as claimed in claim 16, wherein the echo transfer function is stored as a coefficient value of the adaptive filter.

20. The method as claimed in claim 16, wherein the ERLE value is computed by the following equation:

ERLE=10*log10(mean power of the input signal of the adaptive filter)−10*log10(mean power of the output signal of the adaptive filter).

* * * * *